(12) United States Patent
Chung et al.

(10) Patent No.: US 6,810,789 B2
(45) Date of Patent: Nov. 2, 2004

(54) AUTOMATIC TEA MAKER WITH BUOYANCY STRUCTURE

(75) Inventors: Ming-Chi Chung, Taichung County (TW); Chin-Jen Lin, Chiayi (TW)

(73) Assignee: Far East College, Tainan (TW)

( * ) Notice: Subject to any disclaimer, the term of this patent is extended or adjusted under 35 U.S.C. 154(b) by 0 days.

(21) Appl. No.: 10/806,195

(22) Filed: Mar. 23, 2004

(65) Prior Publication Data

US 2004/0194632 A1 Oct. 7, 2004

(30) Foreign Application Priority Data

Apr. 1, 2003 (TW) ........................................ 92205041 U

(51) Int. Cl.⁷ ................................................. A47J 31/00
(52) U.S. Cl. .......................... 99/299; 99/285; 99/306; 99/323; 99/323.3
(58) Field of Search .......................... 99/279–283, 299, 99/300–320, 323, 510, 323.3, 495, 516; 210/474–479, 181; 426/241, 433

(56) References Cited

U.S. PATENT DOCUMENTS

| | | | | |
|---|---|---|---|---|
| 2,021,293 A | * | 11/1935 | De Silva | 99/299 |
| 4,785,723 A | * | 11/1988 | Sheen | 99/279 |
| 5,632,193 A | * | 5/1997 | Shen | 99/285 |
| 5,632,194 A | * | 5/1997 | Lin | 99/285 |
| 5,725,765 A | * | 3/1998 | Shen | 210/238 |
| 5,826,493 A | * | 10/1998 | Tien Lin | 99/306 |
| 5,832,809 A | * | 11/1998 | Gras | 99/299 |
| 5,855,160 A | * | 1/1999 | Shen | 99/279 |
| 5,862,739 A | * | 1/1999 | Lin | 99/285 |
| 6,058,827 A | * | 5/2000 | Lin Tien | 99/299 |
| 6,164,190 A | * | 12/2000 | Tien Lin | 99/299 |
| 6,343,542 B1 | * | 2/2002 | Shen | 99/299 |
| 6,443,050 B2 | * | 9/2002 | Timm | 99/299 |

* cited by examiner

*Primary Examiner*—Timothy F. Simone

(57) ABSTRACT

An automatic tea maker device with buoyancy structure including a teacup, a percolator cup, and a cap, wherein two tube members are configured within a receptacle of the percolator cup, and lower portions of the two tube members are interconnected with a passage there between. A float is configured within one of the tube members to actuate a limit flow rod penetrated within a through hole. A plug end of the limit flow rod seals a tea outlet of a filter seat. A pull rod having a plunger head is disposed within the other tube member. Tea within the percolator cup slowly seeps into one of the tube members through an interstice between the limit flow rod and the through hole, thereby causing the float to float upwards, thus opening the tea outlet allowing the ready steeped tea to flow into the teacup, thereby achieving objective of time setting.

5 Claims, 10 Drawing Sheets

AUTOMATIC TEA MAKER WITH BUOYANCY STRUCTURE

BACKGROUND OF THE INVENTION (a) Field of the Invention

The present invention relates to an automatic tea maker device with buoyancy structure, and more particularly to the tea maker device that enables tea to slowly seep into tube members through an interstice between a limit flow rod and a through hole, and after a period of time a tea outlet opens, thus allowing the tea to automatically flow into a teacup, thereby achieving effectiveness of timing and automation.

(b) Description of the Prior Art

Because of great number of persons brewing tea, accordingly, quality of brewing tea is increasingly being paid attention to, particularly steeping time of tea leaves must be timed to perfection. If the steeping time is too short, essence of the tea leaves will not be completely infused into water, while if the steeping time is too long, then taste of the tea will be too bitter and astringent. Hence, control of the steeping time of the tea leaves is an absolute necessity, and only then can a pot of good tea be brewed. However, present methods for calculating the steeping time rely on experience and judgment of the person brewing the tea, and thus enormous deviations frequently occur while controlling the steeping time, and is generally difficult for a beginner to accurately keep track of the appropriate steeping time. Consequently, in order to accurately control the steeping time, a teacup provided with a timer device has appeared on market, which realizes separating the tea leaves from the tea by means of setting the steeping time on the timer device, thereby ensuring the quality of the tea. Nevertheless, because the timer device atop the teacup relies on a battery for electrical supply, and moreover, a circuit board needs to be configured within the timer device, thus, manufacture and usage costs and problems of environmental protection make the timer device an unideal solution. In addition, the timer device lacks eye appeal, and manifests a feeling of brusqueness, moreover, the timer device is difficult to clean, and there is a fear of damaging electronic parts within the timer device. Accordingly, such timer device is considerably unideal in practical usage.

SUMMARY OF THE INVENTION

The present invention primarily comprises a teacup, a percolator cup and a cap, wherein the teacup provides for containing ready steeped tea. The percolator cup is fitted atop the teacup, and a receptacle is defined within the percolator cup having two tube members configured within the receptacle so as to vertically protrude therein. Lower portions of the two tube members are interconnected with a passage there between, and a through hole is defined in a base of one of the tube members. A float is configured within one of the tube members, and a limit flow rod is affixed to a bottom end of the float, whereby the limit flow rod provides for penetrating the through hole. A plug end is joined to a bottom end of the flow end. An adjustable press arm is configured within an upper portion of one of the tube members, and a pull rod is disposed within the other tube member. A plunger head is configured at a bottom end of the pull rod, and which maintains a tight seal with an inner wall of the tube member. In addition, a filter seat is configured at a base of the percolator cup, and a plurality of sieve pores are defined in the filter seat. A tea outlet is defined in a base of the filter seat, which provides for the plug end of the limit flow rod to furnish sealing thereof. Furthermore, a cap is fitted atop the percolator cup.

An objective of the present invention is to provide functionality to set steeping time for different tea leaves, and, moreover, enable automatic flowing of ready steeped tea into the teacup, which can then be drunk. Furthermore, an automatic tea maker device with buoyancy structure of the present invention provides a prompt, convenient, and simple method for brewing of tea, while furnishing an eye appealing outer appearance.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
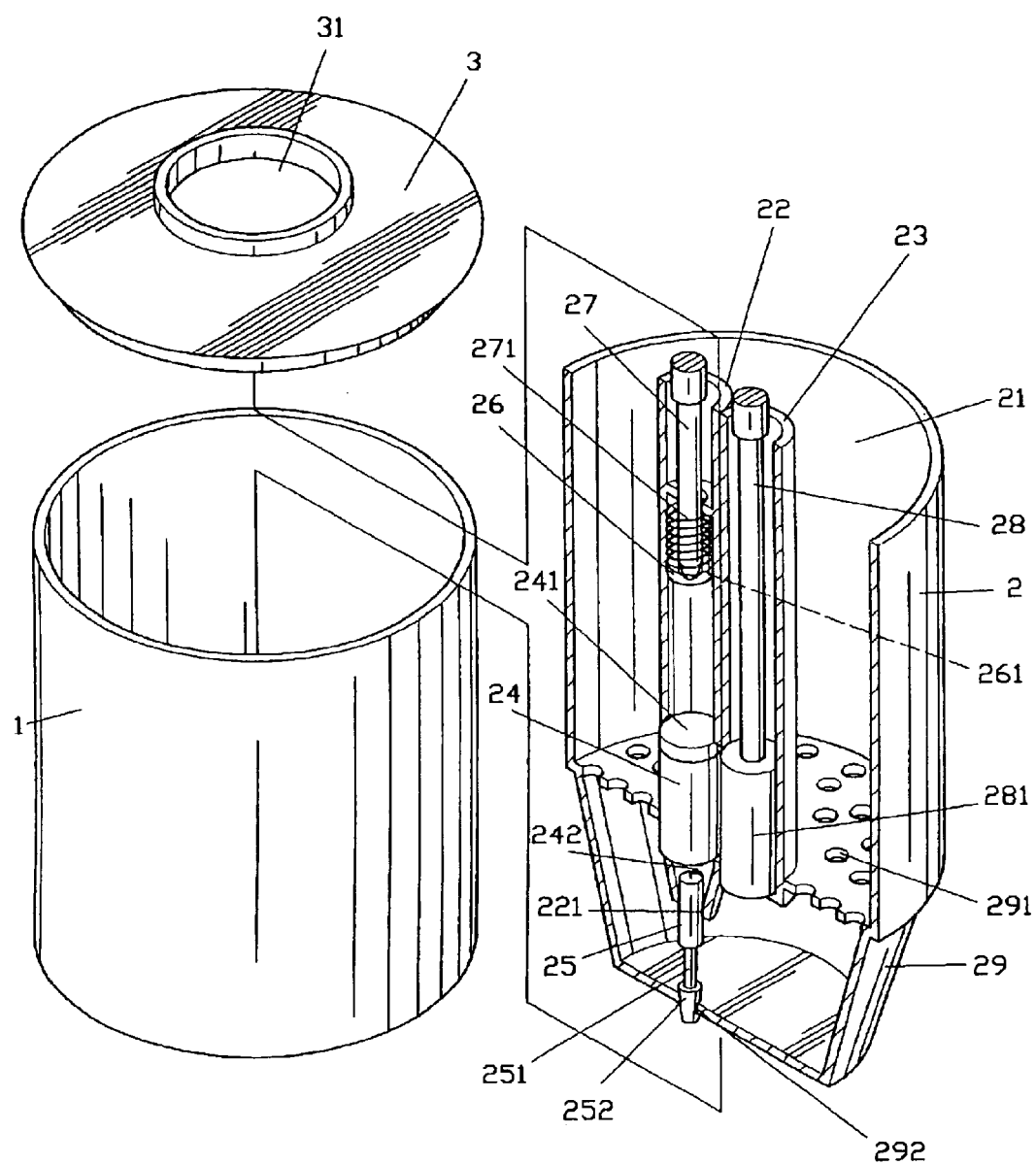
FIG. 1 shows an exploded elevational view according to the present invention.
Figure 2:
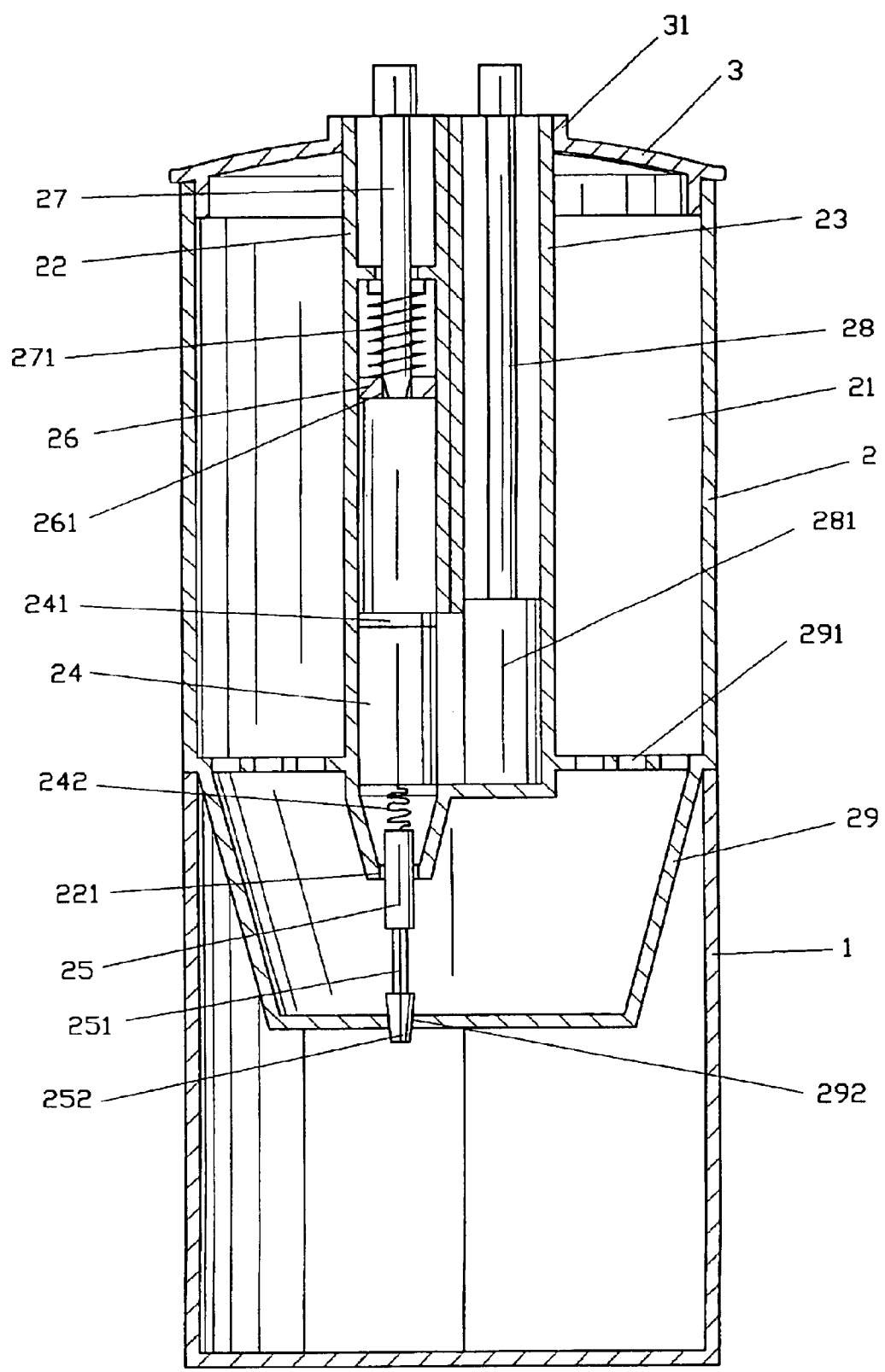
FIG. 2 shows an assembled schematic view according to the present invention.
Figure 3:
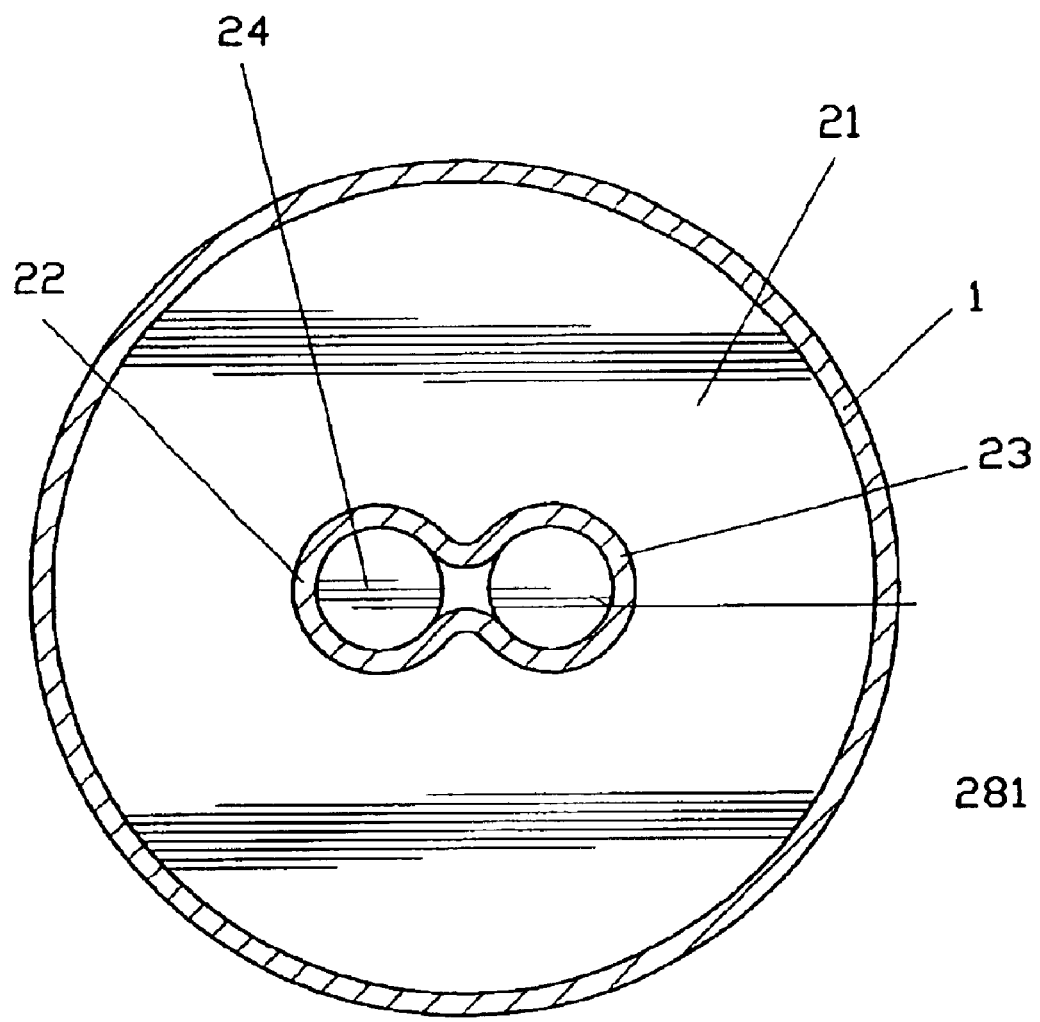
FIG. 3 shows a top view of a percolator cup according to the present invention.

Referring to FIGS. 1, 2 and 3, which show the present invention primarily comprising a teacup (1), a percolator cup (2) and a cap (3), wherein:

The teacup (1) provides for containing tea.

The percolator cup (2), which is fitted atop the teacup (1), and a receptacle (21) are defined within the percolator cup (2). Two tube members (22) and (23) are configured within the receptacle (21) so as to vertically protrude therein. Lower portions of the two tube members (22) and (23) are interconnected with a passage there between, and a through hole (221) is defined in a base of the tube member (22). A float (24) is configured within the tube member (22), and an iron piece (241) is attached to a top end of the float (24). A flexible wire member is affixed to a bottom end of the float (241), and a limit flow rod (25) is affixed to another end of the wire member (242), whereby the limit flow rod (25) provides for penetrating the through hole (221). External diameter of the limit flow rod (25) is slightly smaller than internal diameter of the through hole (221). A flow end (251) having an external diameter slightly smaller than that of the limit flow rod (25) is joined to the bottom end of the limit flow rod (25), and a plug end (252) is joined to a bottom end of the flow end (251). An annular magnet (26) is further configured directly above the float (24) within the tube member (22), and a perforation (261) is defined in the magnet (26). A press arm (27) is configured above the magnet so as to be enabled to penetrate the perforation (261) of the magnet (26) if pressed downwards thereon, and a spring (271) providing compressibility is configured so as to sheave the press arm (27), whereby pressing down on the press arm (27) causes the spring (271) to compress, and thus results in a bottom end of the press arm (27) extending and thereby penetrating through the perforation (261) of the magnet (26). A pull rod (28) is disposed within the other tube member (23), and a plunger head (281) made from plastic material is configured at a bottom end of the pull rod (28). The plunger head (281) is displaced within an inner wall of the tube member (23) by means of pushing and pulling on the pull rod (28), while maintaining a tight seal with the inner wall of the tube member (23). In addition, a filter seat (29) is configured at a base of the receptacle (21) of the percolator cup (2), and a plurality of sieve pores are defined in a connecting face between the filter seat (29) and the percolator cup (2). A base of the filter seat (29) is adapted so as to be completely sealed apart from a tea outlet (292) defined therein, whereby the tea outlet (292) provides for the plug end (252) of the limit flow rod (25) to furnish sealing thereof.

The cap (3) covers an upper mouth of the percolator cup (2), and an opening (31) is defined in a pinnacle of the cap (3), which provides for disposing of the two tube members (22) and (23) therein.

Figure 4:
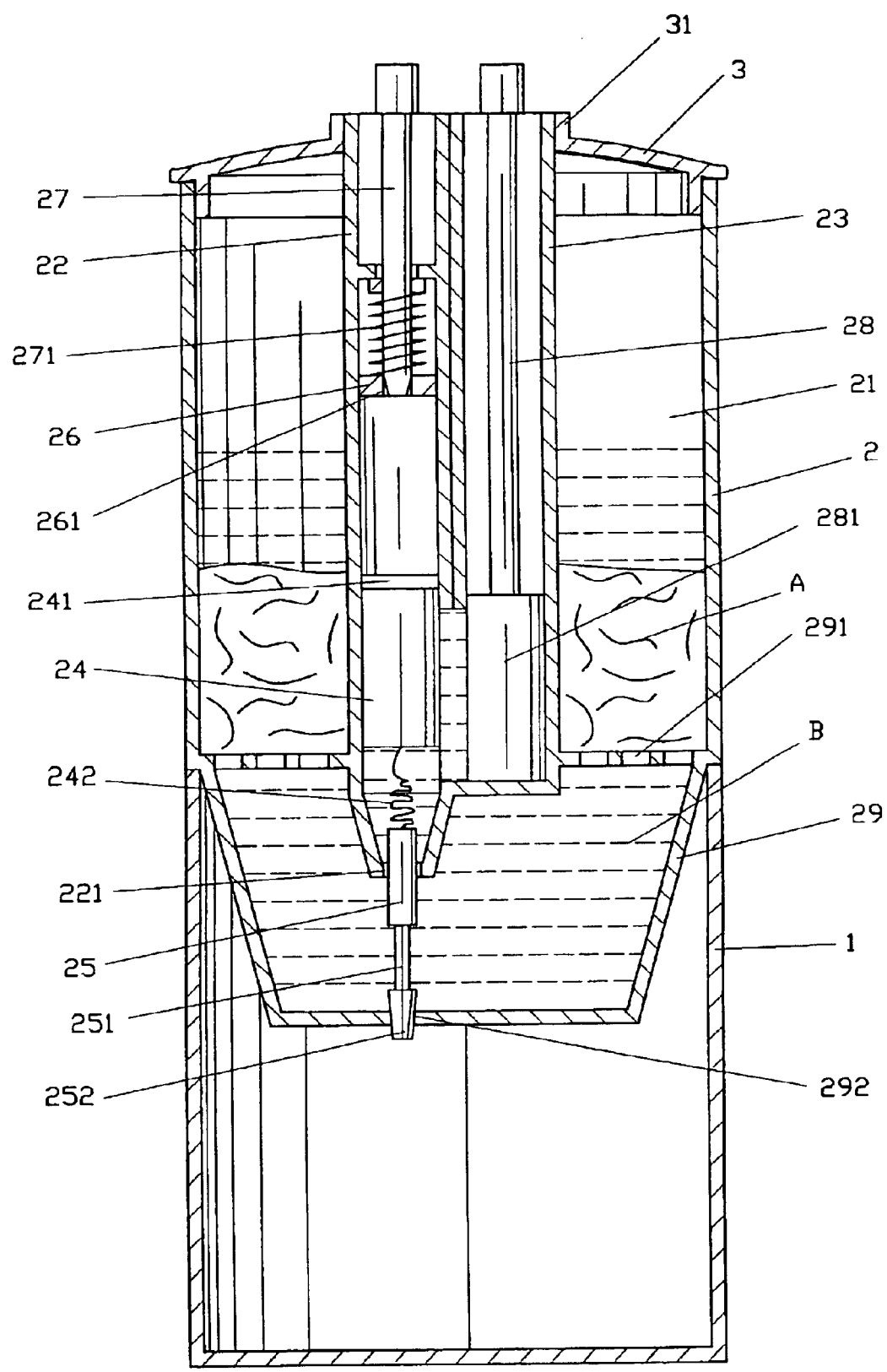
FIG. 4 shows a cross sectional schematic view of a tea maker device in usage according to the present invention.
Figure 5:
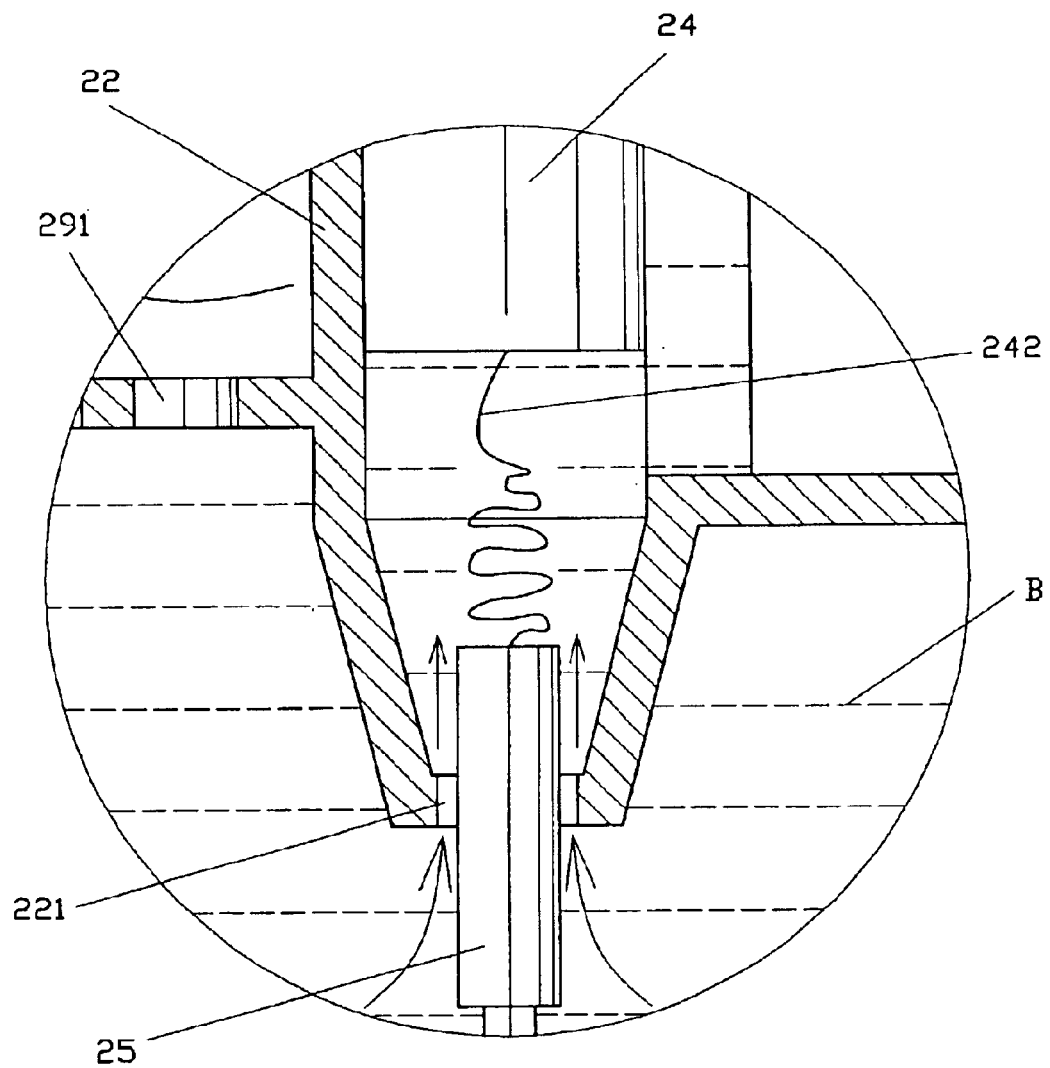
FIG. 5 shows a cross sectional schematic view of tea flow according to the present invention.
Figure 6:
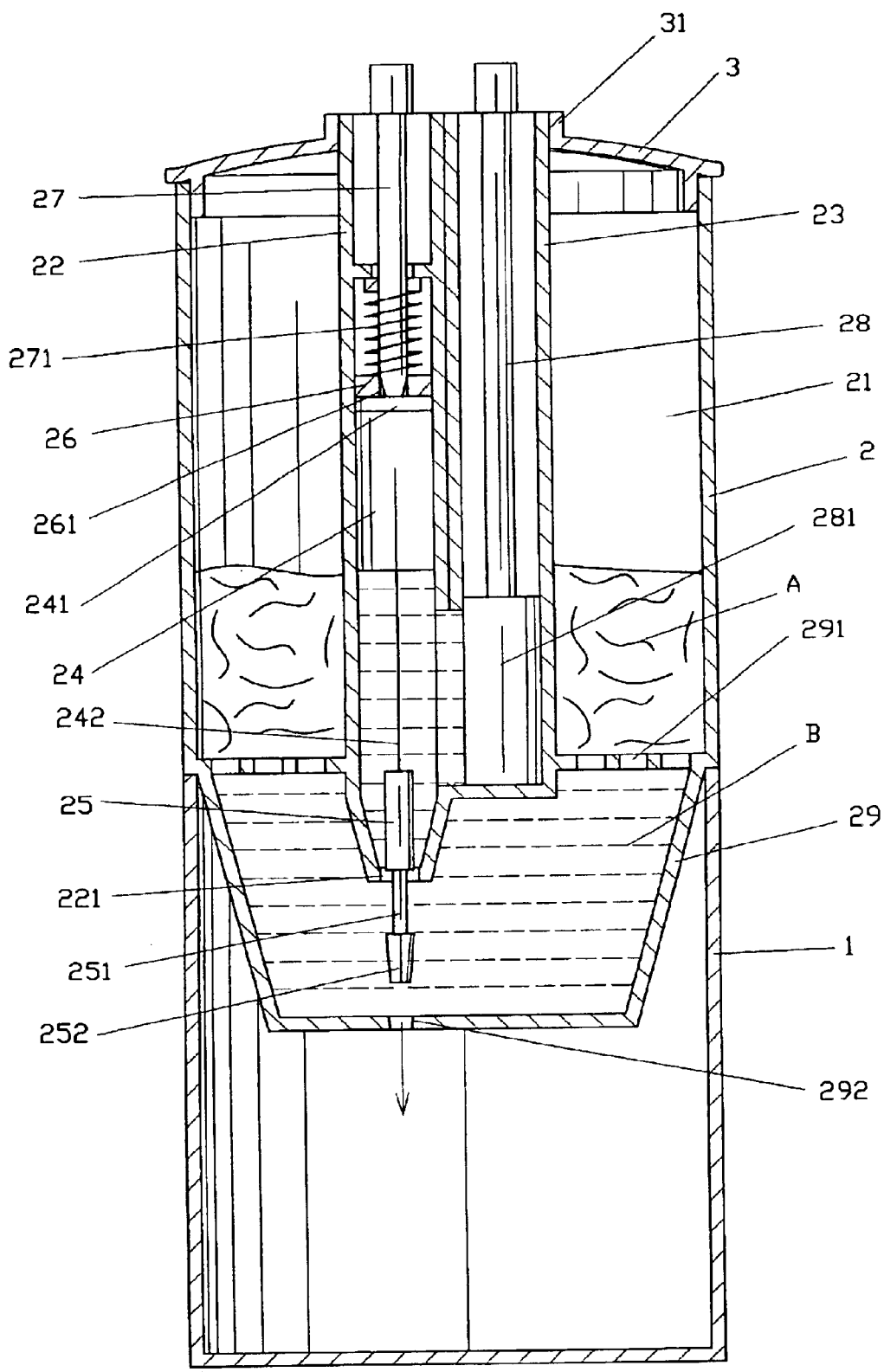
FIG. 6 shows a cross sectional schematic view of a float displaced and opening of a tea outlet according to the present invention.

Referring to FIG. 4, when using the tea maker device, the percolator cup (2) is first fitted atop the teacup (3); thereupon tea leaves (A) are placed into the receptacle (21) of the percolator cup (2), and boiling water is poured into the receptacle (21) thereafter. The cap (3) is then fitted atop the percolator cup (2), whereupon steeping of the tea (A) commences, and tea (B) is brewed therefrom. Thereat, the tea (B) filters through the sieve pores (291) of the filter seat (29) from the base of the receptacle (21) and into the filter seat (29), and the tea (B) thereby gradually accumulates within the filter seat (29). Upon the tea (B) rising higher than the through hole (221) at the base of the tube member (22), because the tea (B) exterior of the tube member (22) rises higher than the tea (B) within the tube member (22), then by means of a siphon principle the tea (B) slowly seeps through an interstice between the limit flow rod (25) and the through hole (221) into the tube member (22) (see FIG. 5). While the water level is gradually rising, the float (24) inside the tube member (22) thereby also floats along with the rising tea (B) level and simultaneously pulls on the wire member (242), thus causing the wire member (242) to rise. Upon the float (24) rising to within an attraction range of the magnet (26), thereat the iron piece (241) atop the float (24) is quickly attracted towards and magnetically affixed to the magnet (26) thereof. Because the float (24) is attached to the iron piece (241) there underneath, then the wire member (242) below the float (24) simultaneously pulls upwards on the limit flow rod (25), thereby causing the flow end (251) below the limit flow rod (25) to rise in position within the through hole (221), and thus an increase in size in the interstice between the flow end (251) and the through hole (221) is realized thereof, which allows the tea (B) to quickly flow through the interstice and into the filter seat (29), whereupon the plug end (252) of the limit flow rod (25) simultaneously unblocks the tea outlet (292) in the base of the filter seat (29). After opening up of the tea outlet (292), the ready brewed tea (B) quickly flows into the teacup (1) thereof, and the tea (B) is thereby ready for drinking.

Figure 7:
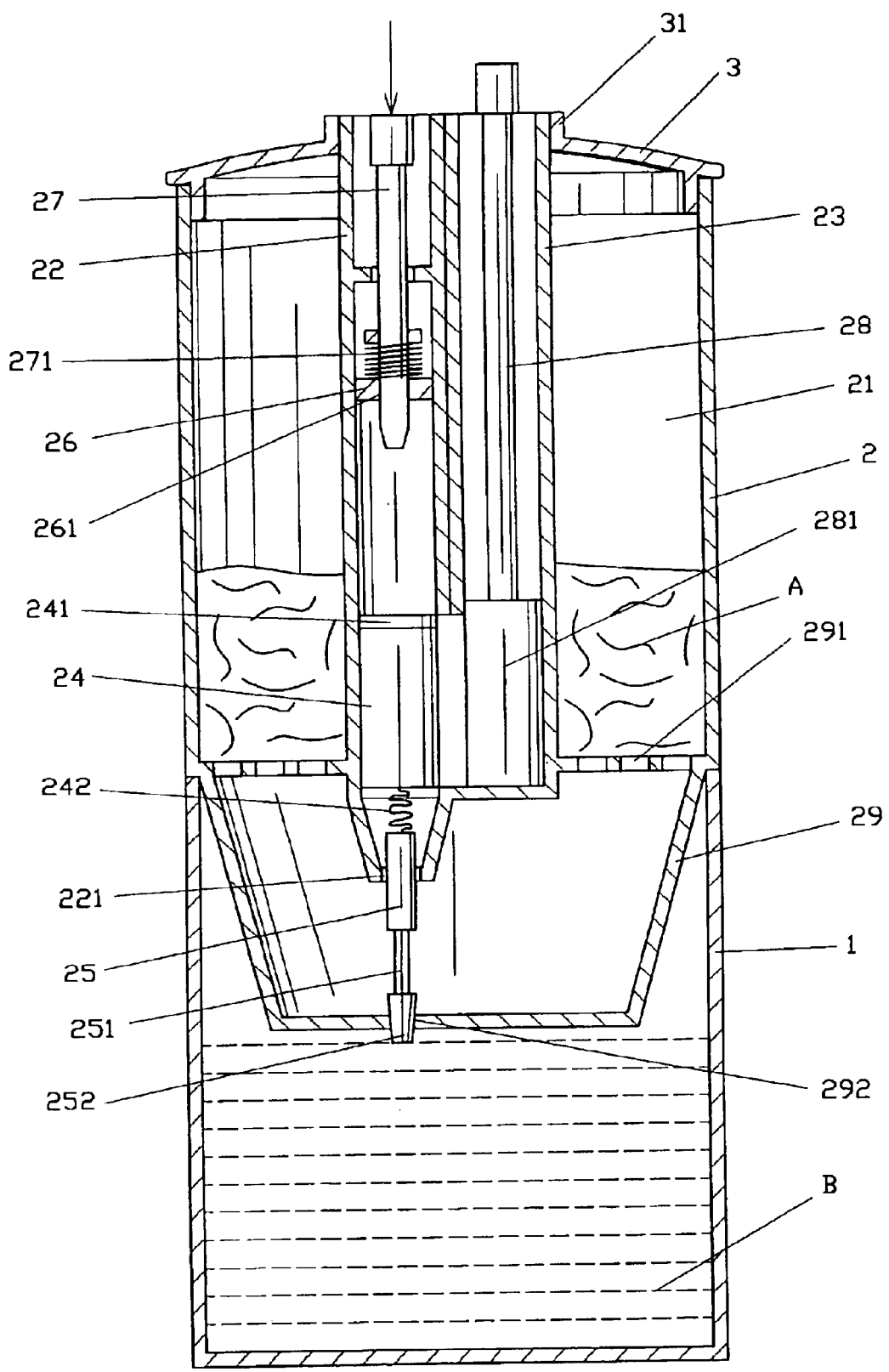
FIG. 7 shows a cross sectional schematic view of a press arm being pressed according to the present invention.

Referring to FIG. 7, if a user wishes to once again steep the tea (A), the user need only press down on the press arm (27), thereby causing the press arm (27) to protrude out from the perforation (261) of the magnet (26) and thus push away the iron piece (241) atop the float (24) from the magnet (26), which causes the float (24) to become separated therefrom, consequently allowing the float (24) to fall to the bottom portion of the tube member (22). Thereupon the limit flow rod (25) re-penetrates the through hole (221), and the plug end (252) configured at a lower extremity of the limit flow rod (25) again seals the tea outlet (292). Hence, control of the tea (B) flowing through the interstice between the limit flow rod (25) and the through hole (221) enables the tea (B) to slowly seep into the tube member (22), and after a deferred period of time when steeping of the tea leaves (A) has completed, only then does the float (24) rise within the tube member (22) by an attractive force of the magnet (26) and become attractively fixed thereto, and thus automatically opening up the tea outlet (292), which thereby allows the ready steeped tea (B) to flow into the teacup (1). In order to prevent having to manually pour out the tea (B) from the filer seat (29), size of the interstice between the limit flow rod (25) and the through hole (221) can be varied, thereby producing different flow rates. In addition, volume of retaining space within the tube member (22) is equally a factor influencing length of the steeping time of the tea leaves (A), thus the prime steeping time can be realized based on different specifications preset in design of the tea making device.

Figure 8:
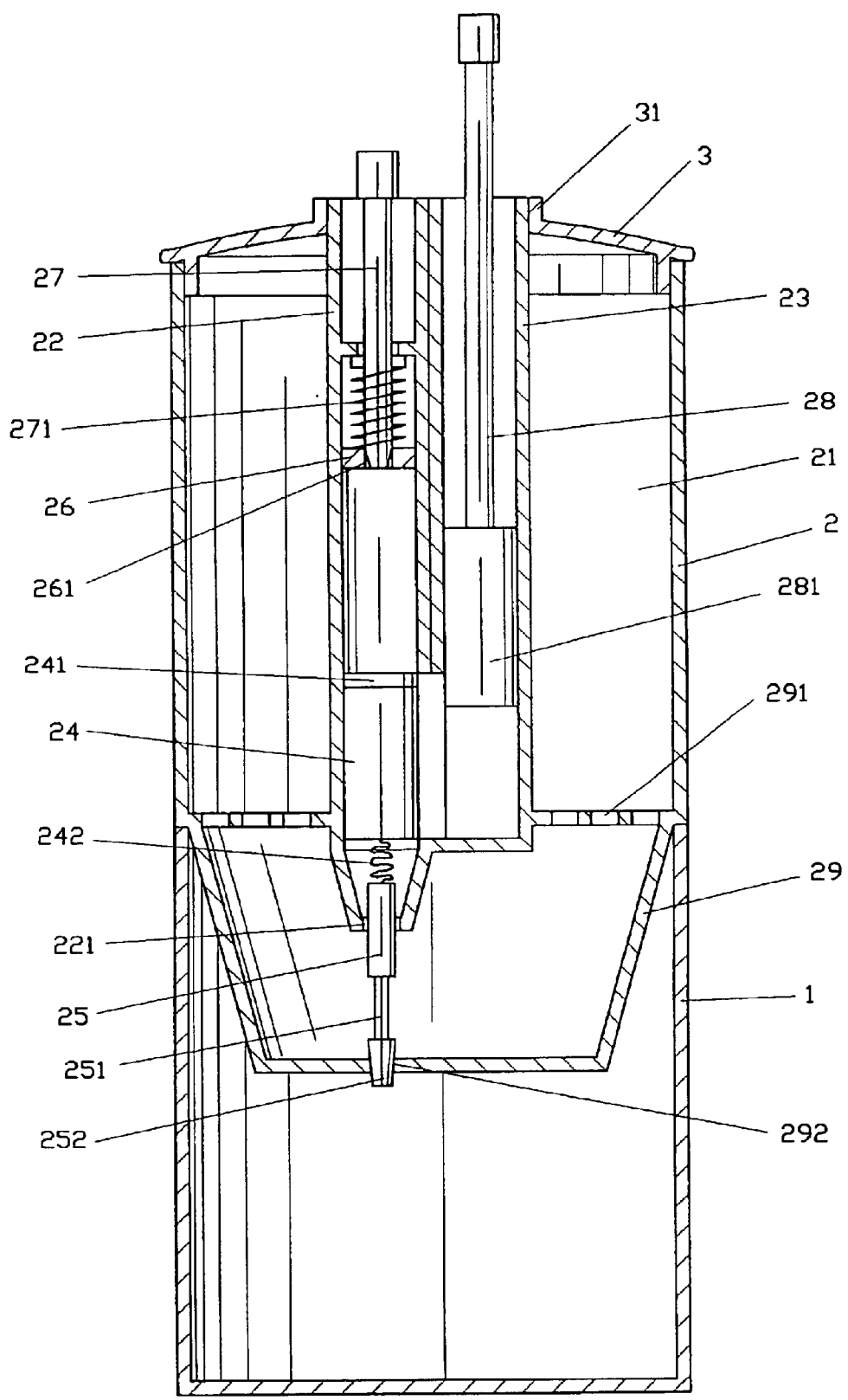
FIG. 8 shows a cross sectional schematic view of a pull rod being displaced according to the present invention.
Figure 9:
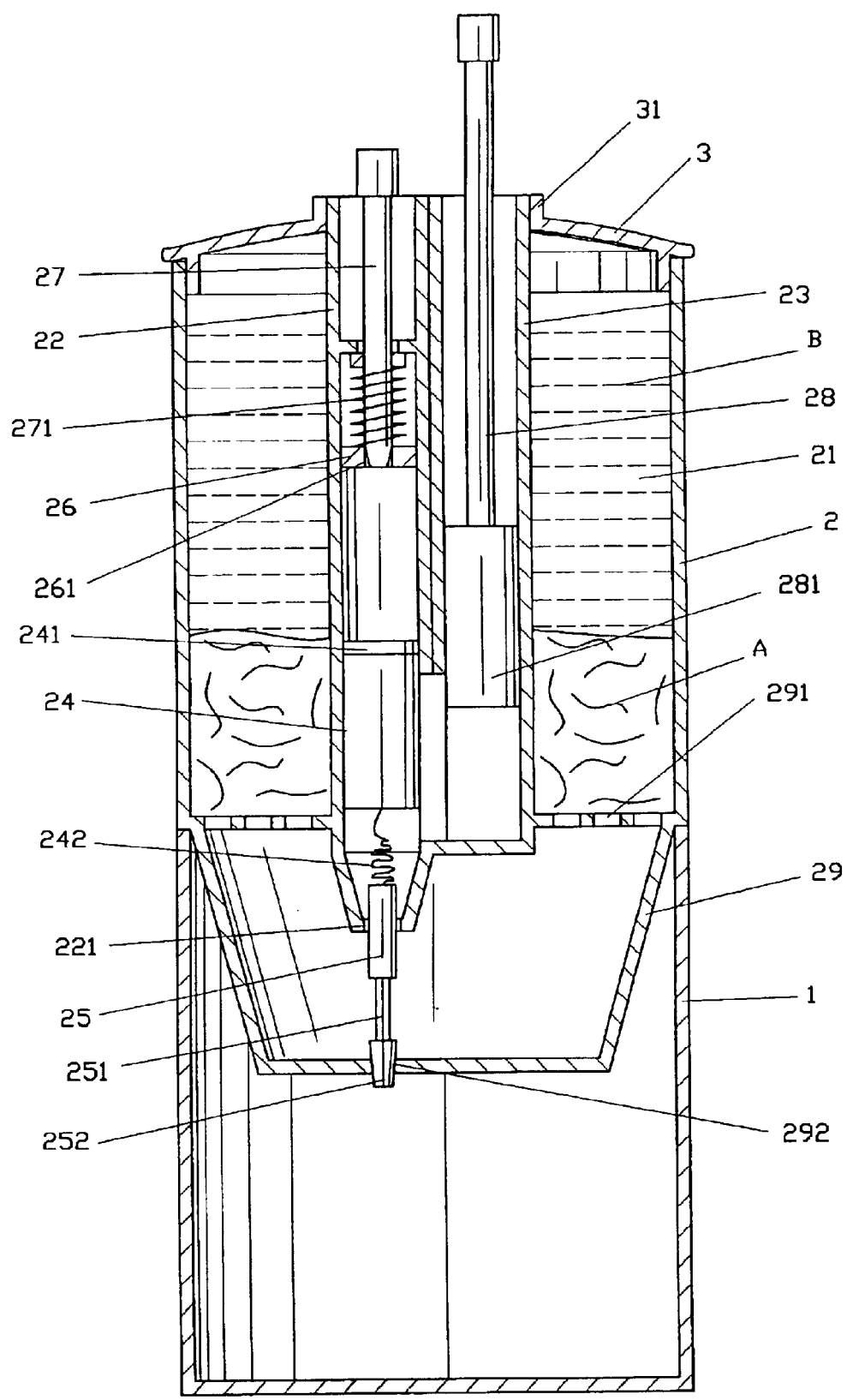
FIG. 9 shows a cross sectional schematic view of the tea maker device in usage according to the present invention.
Figure 10:
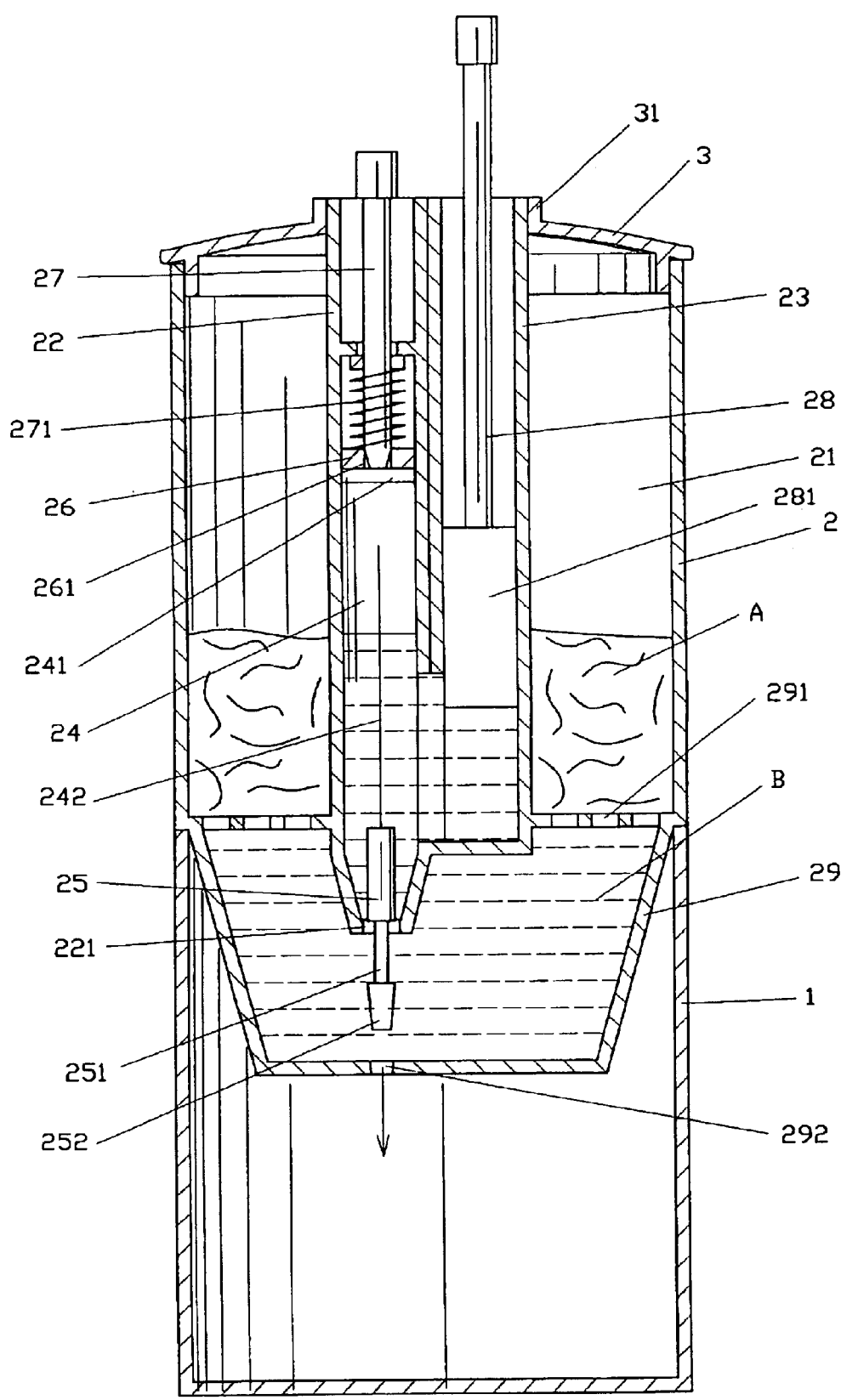
FIG. 10 shows a cross sectional schematic view of the float displaced and opening of the tea outlet according to the present invention.

Furthermore, in order to complement the length of different steeping times of the different tea leaves (A); the pull rod (28) within the tube member (23) can be pulled upwards to an appropriate distance (see FIG. 8) (time graduations are configured on a body surface of the pull rod (28), whereby pulling the pull rod (28) up to a distance from the opening (31) of the cap (3) a length of the time setting is thereby indicated), and the plunger head (281) configured at an extremity of the pull rod (28) is correspondingly upwardly displaced within the tube member (23), thus a space below the plunger head (281) at a bottom portion within the tube member (23) will increase accordingly. Hence, when the tea (B) flows into the filter seat (29) through the sieve pores (291) of the filter seat (29) at the base of the receptacle (21) (see FIG. 9); the tea (B) thereupon slowly rises within the filer seat (29). When the water level is higher than the through hole (221) at the base of the tube member (22), thereupon the tea (B) will slowly seep into the tube member (22) through the interstice between the limit flow rod (25) and the through hole (221), moreover, the tea (B) simultaneously flows into the tube member (23). An appropriate quantity of tea (B) can be contained within the tube member (23) by increasing internal volume of the tube member (23), and thus defer rising flow rate of the tea (B). Upon the float (24) rising within the attraction range of the magnet (26), the iron piece (241) of the float (24) is quickly attracted towards and magnetically affixed to the magnet (26) thereof, and thereby realizes opening up of the tea outlet (292) (see FIG. 10). Hence, different steeping times for the tea (B) can be set according to different positions of the pull rod (28) within the tube member (23), and thereby realizes functionality for automatic timing.

The present invention is provided with the following advantages:

1. Realization of full-automatic steeping of the tea leaves (B). Furthermore, as soon as the steeping time is up, then the prepared steeped tea (B) automatically flows into the teacup (1) ready for drinking thereof.

2. Effectuates increase or decrease in water volume space within the tube member (23) by means of pulling or pushing on the pull rod (28), and in order to coordinate with the different steeping times of the varied tea leaves (A), the pull rod (28) can manually set the steeping time of the tea leaves (A), thereby achieving effectiveness of convenience and speed.
3. Completely eliminates need for a timer having electronic components, and therefore reduces manufacturing and usage costs.
4. All structural members are completely concealed within the percolator cup (2), thereby maintaining an integral and eye appealing outer appearance.
5. Assemble and disassemble of the structural members of the present invention is uncomplicated and facile, thereby facilitating cleaning and storage, and thus ensuring hygiene and cleanliness of the device.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. An automatic tea maker with buoyancy structure comprising:

a teacup, which provides for containing ready steeped tea therein;

a percolator cup, which is fitted atop the teacup, and a receptacle is defined within the percolator cup;

a cap, which covers atop the percolator cup, and an opening is defined in a pinnacle of the cap;

and characterized in that:

two tube members are configured within the receptacle so as to vertically protrude therein, and lower portions of the two tube members are interconnected with a passage there between, wherein a through hole is defined in a base of one of the tube members, and a float is configured within the tube member; a limit flow rod is affixed to a bottom portion of the float, whereby the limit flow rod provides for penetrating a through hole, and a plug end is joined to an extremity of a flow end; an adjustable press arm is configured within an upper portion of one of the tube members, and a pull rod is disposed within the other tube member, a plunger head is configured at a bottom end of the pull rod, which maintains a tight seal with an inner wall of the tube member; in addition, a filter seat is configured at a base of the percolator cup, and a plurality of sieve pores are defined in the filter seat, a tea outlet is defined in a base of the filter seat, and which provides for the plug end of the limit flow rod to furnish sealing thereof.

2. The automatic tea maker with buoyancy structure according to claim 1, wherein external diameter of the limit flow rod is slightly smaller than internal diameter of the through hole.

3. The automatic tea maker with buoyancy structure according to claim 1, wherein interstices of different diameter are configured between the limit flow rod and the through hole.

4. The automatic tea maker with buoyancy structure according to claim 1, wherein an iron piece is configured atop the float, and an annular magnet is further configured directly above the float within the tube member, a perforation is defined in the magnet, which provides for the press arm to penetrate there through, and a compressible spring is configured so as to sheave the press arm.

5. The automatic tea maker with buoyancy structure according to claim 1, wherein a wire member mutually connects the float and the limit flow rod.

* * * * *